Jan. 19, 1960

J. P. PIETRASZ 2,921,647

MOISTURE SEPARATOR

Filed June 2, 1958

Inventor
Janislaw P. Pietrasz
by
His Attorney

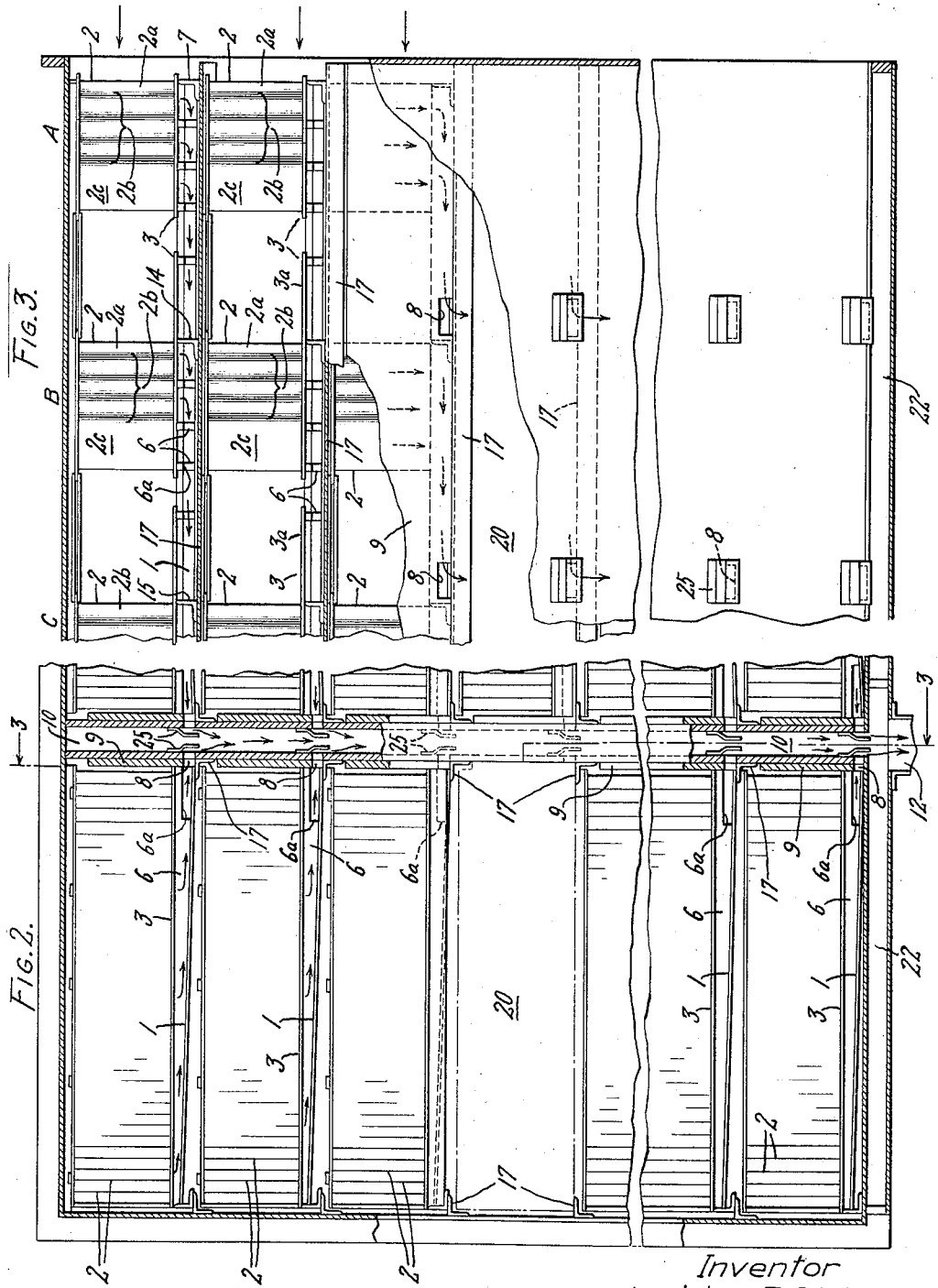

2,921,647
MOISTURE SEPARATOR

Janislaw P. Pietrasz, Schenectady, N.Y., assignor to General Electric Company, a corporation of New York Application June 2, 1958, Serial No. 739,341

7 Claims. (Cl. 183—111)

This invention relates to gas-liquid separation apparatus, particularly to a moisture separator for use in a steam turbine to remove large quantities of condensate entrained in saturated steam, as for instance in the "cross-over conduit" connecting an intermediate pressure turbine section with a low pressure section.

In a compound steam turbine, it is found desirable to remove as much entrained moisture from the saturated steam as possible, in lower pressure portions of the flow path, before the steam enters succeeding turbine sections. This results from the fact that wet steam reduces the output of the turbine; and the drops of moisture impinging on the rapidly moving rotor blades cause rapid erosion of the inlet edges. Various devices have been tried for removing moisture from saturated steam. These have included centrifugal separators and various types of baffles and screen arrangements, which, although more or less effective, are not capable of the desired high degree of moisture separation, with minimum pressure drop through the separator.

A highly efficient moisture separator is particularly desirable when steam below the saturation line having a relatively high moisture content is used in the low pressure section of a compound turbine unit, such as that found in a turbine receiving saturated steam from a "boiling water" nuclear reactor. The necessity for a highly efficient moisture separator can be appreciated when it is realized that in such a turbine powerplant of a capacity on the order of 192,000 kw., there could be upwards of 180,000 pounds of water per hour flowing through the separator.

Accordingly, it is an object of this invention to provide an improved separator which removes most of the moisture from steam flowing therethrough with a minimum drop in pressure.

Another object is to provide a relatively simple, low cost, separator construction which is easily assembled and in which parts can be replaced with a minimum of effort and expense.

Other objects and advantages will be apparent from the following description, taken in connection with the accompanying drawings in which:

Fig. 2 is a partial sectional view looking in an axial direction at a separator assembly employing a plurality of units; and Fig. 3 is a sectional view taken along the plane 3—3 of Fig. 2.

Figures 1, 1A:
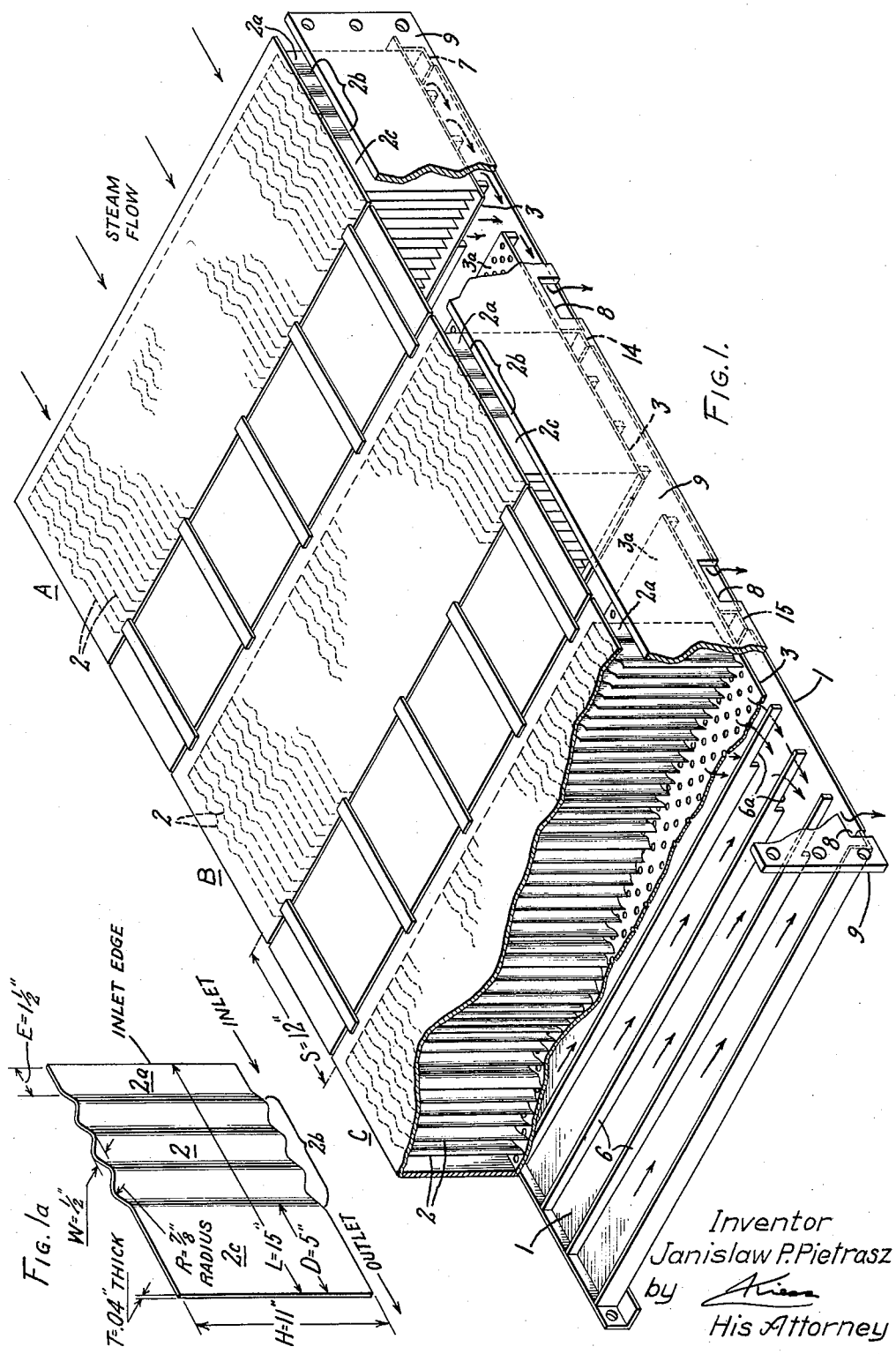
Fig. 1 is a perspective view of one section of the separator assembly.
Fig. 1a is a detail perspective view of one plate of the moisture separating baffle.

Generally stated, the invention is practiced by providing a number of specially shaped, longitudinally spaced groups of vertical, partially corrugated plate members. The moisture separated out by each group of plates is drained away from the main flow path between groups of plates.

Referring now more particularly to Fig. 1, there is illustrated a partial perspective view of one section of the separator assembly. As many of these separator sections (stacked vertically) can be used as desired, depending on the desired effective cross-section area of the steam flow path and the permissible size of the separator assembly. In Fig. 2 is shown a partial cross-section of a cross-over duct between intermediate and low pressure turbines which employs six tiers of separator assemblies. Only one separator tier or section will be described in detail here, since each of the others is of the same construction.

The separator assembly or section as disclosed in Fig. 1 consists of a base plate 1 on which is supported three groups A, B, C in series of partially corrugated plate members 2. These groups A, B, C are longitudinally spaced a substantial distance apart to facilitate gravity removal of the moisture separated by each group of corrugated members. Like reference characters will be used on each group of plates since they are identical.

Referring now to the group of plates A at the extreme right or entrance end of the separator assembly, it is seen that the vertically disposed plates 2 are supported relative to a platform 3, which is spaced from the bottom plate 1 by transversely extending support members 6, which are cut away at 6a for a reason which will be noted later. As can be seen in the group of corrugated plates C, platform member 3 is perforated to permit liquid to drain into the collecting chamber between plates 3 and 1.

As can be seen in Fig. 1a, the plate member 2 has a relatively short flat inlet portion 2a, a corrugated intermediate portion 2b, and a relatively long flat outlet portion 2c. The short flat inlet portion 2a functions to reduce the plate vibration problem and the pressure loss, and the long outlet portion 2c provides a surface on which the moisture droplets coalesce and enter the collecting chamber with minimum tendency to be blown off again into the steam path. The corrugated portion 2b of adjacent plates cooperates to form a tortuous flow path for the moisture-laden steam in which changes in the flow direction act to cause moisture particles to coalesce and contact the plate surfaces.

The second and third groups B, C of corrugated members are identical to group A, with the exception that platform 3 has an upstream projecting portion 3a, which provides an additional opportunity for the coalesced moisture to enter the collecting chamber, protected from contact with the main steam flow. To further prevent moisture separated out by groups A and B from re-entering the flow stream, a number of angle irons 7, 14, 15 are provided, which extend across the width of the plate groups. The bottom plate 1 slopes from left to right in Figs. 1 and 2, so that the moisture removed from the steam drains transversely across the width of the steam flow path to outlet openings 8 formed in the front wall 9 of the assembly. The fluid passes through a vertical collecting chamber 10 (Fig. 2) and drops into drain 12 leading to a reservoir (not shown). As mentioned previously, the plate groups A, B, C are identical; and the drain chamber for each is separated from the next by a transverse dam member 14, 15 (Fig. 1). The cut-away portions 6a of the support members 6 provide communication between the respective drain chambers, defined between pairs of adjacent members 6, to the outlet port 8.

Fig. 2 shows a vertical sectional view illustrating a number of similar separator assemblies mounted in vertical relationship. Each of these sections are as disclosed in Fig. 1, and they are supported on angle irons 17 which permit the package to be readily removed and replaced. One of the packages has been removed from the space 20. Located under adjacent vertical stacks of separator sections is a collecting chamber 22 having drain port 12. Adjacent sections have bottom plates 1 which slope toward vertical collecting chamber 10, and the moisture flows into chamber 22 and out through drain 12. The moisture drained from the upper sections is prevented from re-entering the section below by shields 25 welded to the adjacent plates 9 and disposed in the collecting chamber 10 in spaced relation to the discharge ports 8.

Fig. 3 discloses a sectional view taken along the plane 3—3 of Fig. 2, and illustrates more clearly the design of the individual corrugated plated members 2. It can be seen that the fluid collected by the corrugated members drains down into the chamber formed between the support plate 3 and the base member 1 and drains off to the left toward the vertical collecting chamber 10. The drainage of the moisture in a longitudinal direction takes place through the cutaway portions 6a of support members 6.

The precise configuration of a single corrugated moisture collecting plate member 2 is shown in even more detail in Fig. 1a. Here it will be seen that the plate comprises the comparatively narrow flat inlet edge portion 2a, the intermediate corrugated portion 2b, and the relatively wider discharge edge portion 2c. The precise geometry is illustrated by the representative dimensions given in Fig. 1a. It will be noted that the overall dimensions of the plate are in the proportion of approximately 15 inches long to 11 inches high. The plate may, for instance, be formed of suitable sheet steel on the order of .04 inch thick. The narrow flat inlet edge portion 2a is on the order of 1½ inches long, and the discharge edge portion 2c is on the order of 5 inches long. The corrugations may have a radius of curvature on the order of ⅞ inch, and the pitch of the corrugations is about 2½ inches. The pitch of a corrugation is understood to be the distance between points where the curve starts to "repeat" in a repetitive pattern, i.e. the distance between successive "crests" or "troughs." Therefore, the length of the corrugated portion of the plate shown in the drawings is on the order of 3½ pitch lengths. The overall height of the corrugations, normal to the plane of the plate, is about ½ inch.

The longitudinal spacing 5 (Fig. 1) between banks of plates is shown as 12 inches, compared with the plate length L of 15 inches (Fig. 1a). While the precise value of this spacing S depends on many factors, it is believed that it should be at least half the length of the plate members, to obtain the results described hereinafter.

The functions performed by the various components of the separator assembly will be seen from the following description of the method of operation.

The moisture-laden steam enters the separator at the upper right in Fig. 1 and enters the spaces formed between the flat inlet portions 2a that extend parallel to the steam flow. This relationship between the plates 2 and steam flow path substantially reduces the pressure loss in the steam which would result from turbulence due to the steam impinging on a surface that did not extend parallel to the steam flow. The wet steam then passes through the tortuous paths formed by the adjacent corrugated sections 2b, and centrifugal force causes the moisture to coalesce and impinge on the corrugated sections, and a portion drains down the corrugations and through the perforated plate 3. The slope of bottom plate 1 directs the liquid transversely to the ports 6a, and through port 8 to collecting chamber 10 whence it flows out through drain 12.

The water droplets, due to their weight, flow through the separator plate assembly at a relatively lower velocity than the steam, with the result that the moisture which is not deposited on the corrugated portion tends to coalesce into larger drops and is eventually deposited on the relatively wide flat discharge portion 2c of plates 2. A large percentage of the drops thus deposited on the trailing edge portion 2c are sufficiently large that they descend by gravity and enter the collecting chamber between succeeding groups of separator plates.

It is particularly important to note the significance of the longitudinal spacing between succeeding groups of separator plates A, B, C. As noted above, this dimension S (Fig. 1) is on the order of 12 inches, with separator plates of the geometry specified in Fig. 1a. This longitudinal spacing between banks of plates is found to be of very great importance, for it furnishes a space in which any sufficiently heavy coalesced drops of liquid in the steam are free to drop under the influence of gravity so as to be deposited on the perforated bottom plate portion 3a in advance of the next succeeding group of separator plates. If the next group of plates were to be spaced closer to the upstream group, more and more of these coalesced droplets would be deposited on the leading edge of the next group of plates, whence they might be picked up again by the rapidly flowing steam. By furnishing a certain longitudinal spacing S, gravity is given a chance to participate in the separation process.

The comparatively long trailing edge portions 2c of the plates likewise provide the opportunity for any coalesced particles which have been deposited on the corrugations to flow diagonally under the influence of gravity and the steam flow so as to reach the perforated bottom plate 3 and be drained away before they reach the extreme discharge edge of the portion 2c. It will be obvious that if a drop runs diagonally across the portion 2c and reaches the extreme discharge edge, it may readily be blown off into the steam flow. The length of the portion 2c is selected so that a majority of the coalesced droplets deposited on the corrugations will have an opportunity to drain and be removed from the flow path before they reach the extreme discharge edge of the plate. In this connection, it is to be observed that if the plate were corrugated all the way to the extreme discharge edge, coalesced droplets flowing around the curve of the corrugations would tend to be blown off more readily. The flat discharge edge portion 2c provides a surface facilitating vertical travel of the droplets with a minimum tendency for them to be again blown off into the steam flow.

This process is repeated in each group of separator plates, with the result that very effective moisture separation will take place. For example, using three groups of plates designed and spaced longitudinally as described above, results in 87 to 95% of the condensed moisture being separated out of the wetsteam. The pressure loss in a system of this type may be only on the order of 4%. Of course if desired, a larger number of banks of plates could be used in series for further increased moisture separation; but it is believed there should be at least three banks, for moisture separation of the degree noted above. The number of vertical tiers of separator assemblies is of course determined by the total size of the steam flow path, which is dictated by the space available and the steam velocity desired. The effectiveness of the separator is greater when the velocity is as low as feasible.

In the event it is necessary to repair one of the separator assemblies, it is only necessary to remove the individual plate group affected and make the required repairs.

The invention effects removal of over 90% of the entrained moisture by progressively coalescing and separating out by centrifugal force in the corrugated portions, and draining off by gravity acting on droplets adhering to the flat discharge portions of the plates and deposited out in the time interval during flow through the unobstructed space between successive groups of separator plates. The design of the drain passages is such that moisture removed by each plate assembly is prevented from re-entering the steam path.

It will be obvious to those skilled in the art that many changes and substitutions of equivalents might be made in the separator assembly disclosed herein. It is, of course, desired to cover by the appended claims all such modifications as fall within the true spirit and scope of the invention.

What I claim as new and desire to secure by Letters Patent of the United States is:

1. A separator for removing entrained liquid from a gas comprising a plurality of longitudinally spaced banks of plates, each bank of plates including a group of vertical, transversely spaced plates having a flat inlet portion disposed parallel to the gas flow at the separator inlet for reducing turbulence of the gas-liquid mixture flowing between adjacent plates to reduce the pressure loss of the fluid in traversing the separator, an intermediate portion with wavy corrugations of uniform pitch extending normal to the direction of flow to provide a plurality of tortuous parallel flow passages for the fluid whereby entrained liquid particles flowing through the tortuous flow passages impinge on the corrugations to be collected thereby, and a relatively wide outlet portion extending parallel to the plate inlet portion for a distance of at least one half the length of the intermediate corrugated portion for collecting droplets of liquid coalesced and separated by the fluid flowing along the tortuous path between adjacent corrugated portions, and drain chamber means disposed between each bank of plates for collecting liquid separated by the preceding bank of plates, the longitudinal spacing between banks being at least half the length of the plate members to provide a space in which gravity acts on droplets to cause them to drop into the drain means before entering the next succeeding bank of plates.

2. A separator for removing entrained liquid from a gas and liquid mixture including a plurality of longitudinally spaced banks of plates, each bank comprising a group of longitudinally extending, transversely spaced vertical plates, each having a flat inlet portion disposed parallel to the gas flow at the separator inlet for reducing turbulence of the fluid flowing between adjacent plates, an intermediate wavy corrugated portion in which the corrugations are of uniform pitch and extend normal to the flow of the gas and liquid mixture, and a relatively wide flat outlet portion extending parallel to the plate inlet portion for a distance of at least one half the length of the intermediate corrugated portion for collecting droplets of liquid coalesced and separated by the fluid flowing along the tortuous path between adjacent corrugated portions, drainage chamber means disposed at the base of the corrugated plates for collecting liquid separated by the plates, the longitudinal spacing between banks being at least half the length of the plate members to provide a space in which gravity acts on droplets to cause them to drop into the drain means before entering the next succeeding bank of plates, and transversely extending baffle means separating the drainage chamber means for one bank of corrugated plates from the drain chamber means for adjacent banks, whereby the liquid separated from the mixture by one bank of corrugated plates is prevented from re-entering the gas flow path.

3. A liquid separator comprising a plurality of longitudinally spaced groups of longitudinally disposed, transversely spaced vertical separator plates, each plate having a narrow flat inlet portion disposed parallel to the flow path at the separator inlet, an intermediate wavy corrugated portion in which the corrugations are of substantially uniform pitch and extend normal to the flow path and a relatively wide outlet portion extending parallel to the plate inlet portion for a distance at least one half the length of the intermediate corrugated portion on which the liquid drops are deposited after being coalesced and separated by flow through the tortuous paths formed between adjacent plates, a perforated base plate member supporting each bank of separator plates, a drain chamber with a sloping bottom disposed beneath said separator plates for receiving liquid collected from the plates and causing it to drain transversely to one side of the bank of plates, the longitudinal spacing between banks being at least half the length of the plate members to provide a space in which gravity acts on droplets to cause them to drop into the drain means before entering the next succeeding bank of plates, drain means disposed at one side of the bank of separator plates for draining the fluid out of the motive fluid flow path, and transversely extending baffle means for preventing flow of gas longitudinally from the drain chamber of one bank of separator plates to the drain chamber of the next adjacent bank of plates.

4. A separator assembly for removing condensed moisture from high velocity saturated steam in a relatively short distance with low pressure drop including a first tier of longitudinally spaced banks of vertical separator plate members, a second tier of longitudinally spaced vertical separator plate members disposed adjacent said first tier, each tier comprising a plurality of banks of vertical plates longitudinally disposed and transversely spaced to form a plurality of parallel flow passages for the gas-liquid mixture, each separator plate having a flat inlet portion disposed parallel to the flow path at the separator inlet, an intermediate corrugated portion with wavy corrugations of substantially uniform pitch extending vertically relative to the flow path, and a flat outlet portion extending parallel to the plate inlet portion for a distance of at least one half the length of the intermediate corrugated portion, perforated bottom plate means supporting each bank of separator plates, drain chamber means disposed below the perforated bottom plates for removing liquid from the gas flow path after being separated by the corrugated plate structure, the longitudinal spacing between banks being at least half the length of the plate members to provide a space in which gravity acts on droplets to cause them to drop into the drain means before entering the next succeeding bank of plates, said drain chamber having baffle means extending transversely across the drain chamber to prevent longitudinal flow of gas from the drain chamber portion below one bank of plates to the drain chamber portion below the next succeeding bank of plates for preventing re-entry of liquid into the gas flow path downstream of each bank of separator plates.

5. A separator for removing entrained liquid from a gas comprising a plurality of longitudinally spaced banks of plates, each bank of plates including a group of vertical transversely spaced plates having an intermediate portion with wavy corrugations of uniform pitch extending normal to the direction of flow to provide a plurality of tortuous parallel flow paths for the fluid, the overall length of said intermediate portion being on the order of three and one half times the pitch of the corrugations, a flat inlet portion extending in the direction of flow at the separator inlet for a distance on the order of one half pitch length for reducing turbulence of the gas-liquid mixture flowing between adjacent plates to reduce the pressure loss of the fluid in traversing the separator, and a flat outlet portion extending parallel to the inlet portion for a distance of at least half the length of the intermediate corrugated portion for collecting droplets of liquid coalesced and separated by the fluid flowing along the tortuous path between adjacent corrugated portions, and drain chamber means disposed between each bank of plates for collecting liquid separated by the preceding bank of plates and deposited therein by gravity.

6. A separator for removing entrained liquid from a gas comprising a plurality of longitudinally spaced banks of plates, each bank including a group of vertical, transversely spaced plates having a corrugated portion with wavy corrugations of uniform pitch extending normal to the direction of flow to provide a plurality of tortuous parallel flow paths for the fluid, the overall length of said corrugated portion being on the order of three and one half times the pitch of the corrugations, and a flat outlet portion extending in the direction of flow at the separator inlet for a distance of at least half the length of the corrugated portion for collecting droplets of liquid coalesced and separated by the fluid flowing along the tortuous path between adjacent corrugated portions, and gravity drain chamber means disposed between each bank of plates for collecting liquid separated by the preceding bank of plates, the longitudinal spacing between banks being at least half the length of the plate members to provide a space in which gravity acts on droplets to cause them to fall into the drain means before entering the next succeeding bank of plates.

7. A separator for removing entrained liquid from a gas comprising a plurality of longitudinally spaced banks of plates, each bank of plates including a group of vertical, transversely spaced plates having an intermediate portion with wavy corrugations of uniform pitch extending normal to the direction of flow to provide a plurality of tortuous parallel flow paths for the fluid, the overall length of said intermediate portion being from two to four times the pitch of the corrugations, a flat inlet portion extending in the direction of flow at the separator inlet for a distance on the order of one half pitch length for reducing turbulence of the gas-liquid mixture flowing between adjacent plates to reduce the pressure loss of the fluid in traversing the separator, and a flat outlet portion extending parallel to the inlet portion for a distance of at least half the length of the intermediate corrugated portion for collecting droplets of liquid coalesced and separated by the fluid flowing along the tortuous path between adjacent corrugated portions, and drain chamber means disposed between each bank of plates for collecting liquid separated by the preceding bank of plates, the longitudinal spacing between banks being at least half the length of the plate members to provide a space in which gravity acts on the droplets to cause them to fall into the drain means before entering the next succeeding bank of plates.

References Cited in the file of this patent

UNITED STATES PATENTS

| | | |
|---|---|---|
| 675,276 | Hanson | May 28, 1901 |
| 872,027 | Stare | Nov. 26, 1907 |
| 960,374 | Muchka | June 7, 1910 |
| 1,338,143 | McGee | Apr. 27, 1920 |
| 1,610,574 | Moffat | Dec. 14, 1926 |
| 1,686,144 | Colbert | Oct. 2, 1928 |
| 1,814,629 | Hanzlik | July 14, 1931 |
| 1,843,091 | Bull | Jan. 26, 1932 |
| 2,055,048 | Puls | Sept. 22, 1936 |
| 2,180,586 | Gustafsson | Nov. 21, 1939 |
| 2,217,130 | Niebart | Oct. 8, 1940 |
| 2,256,115 | Hobbs | Sept. 16, 1941 |
| 2,298,242 | Wegmann | Oct. 6, 1942 |
| 2,315,226 | Rohlin | Mar. 30, 1943 |

FOREIGN PATENTS

| | | |
|---|---|---|
| 665,791 | France | May 13, 1929 |
| 674,541 | France | Oct. 22, 1929 |
| 740,845 | France | Nov. 21, 1932 |
| 1,056,258 | France | Oct. 21, 1953 |
| 321,268 | Great Britain | Nov. 7, 1929 |
| 148,657 | Australia | Oct. 16, 1952 |